Jan. 31, 1956

S. C. COLLINS 2,732,693

METHODS OF TREATING GASES

Filed Oct. 1, 1953

Inventor:
Samuel C. Collins.
By Louis A. Maxson
Attorney.

Inventor:
Samuel C. Collins
by Louis A. Maxson
Attorney.

Jan. 31, 1956
S. C. COLLINS
2,732,693
METHODS OF TREATING GASES
Filed Oct. 1, 1953
3 Sheets-Sheet 3
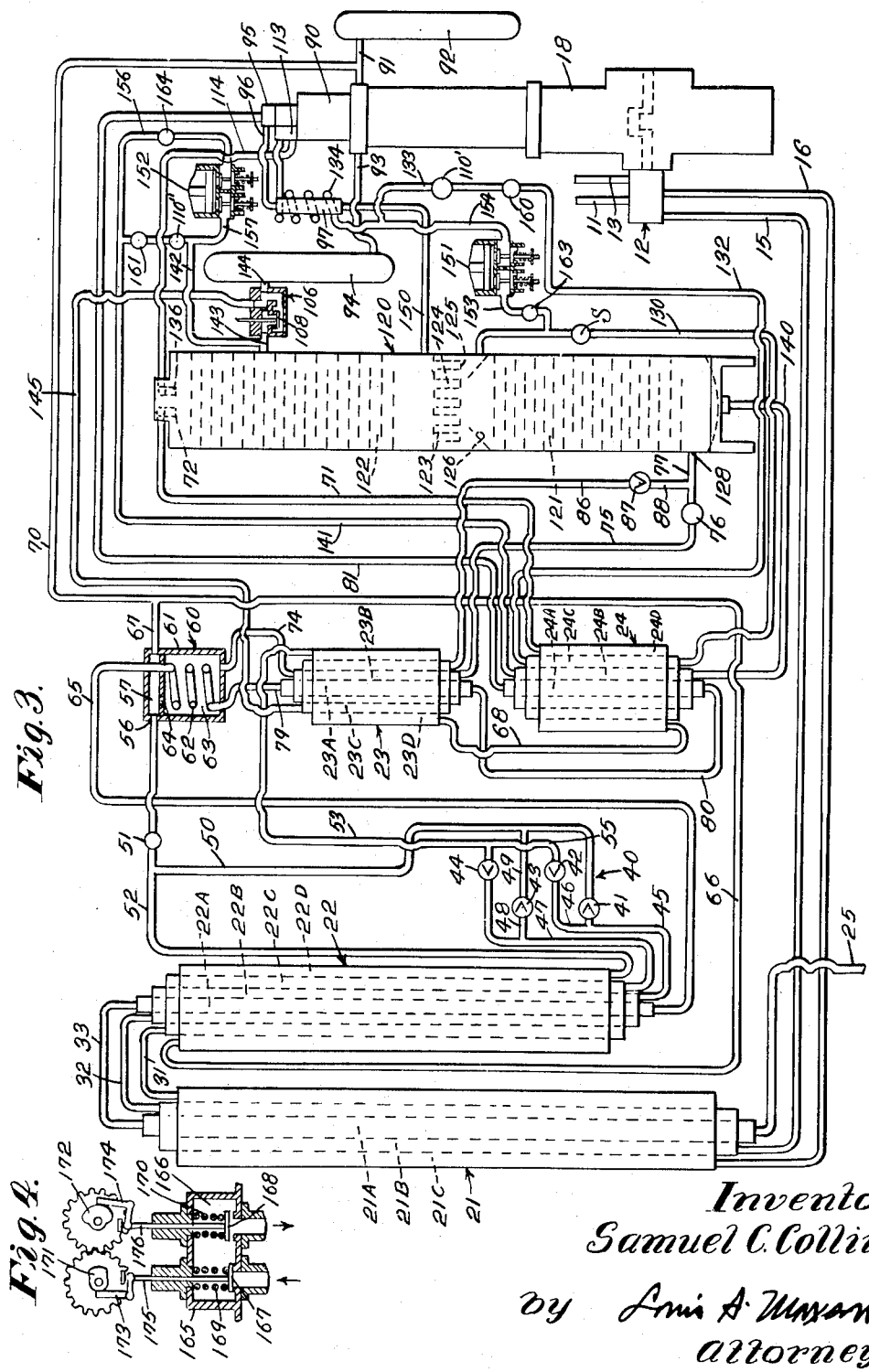
Inventor:
Samuel C. Collins.
by Louis A. Maxan.
Attorney.

United States Patent Office 2,732,693
Patented Jan. 31, 1956

2,732,693

METHODS OF TREATING GASES

Samuel C. Collins, Watertown, Mass., assignor to Joy Manufacturing Company, Pittsburgh, Pa., a corporation of Pennsylvania Application October 1, 1953, Serial No. 383,437

12 Claims. (Cl. 62—175.5)

This invention relates to improvements in methods of treating gases.

It will herein be described particularly in its application to the production of substantially pure oxygen from air, but this is but illustrative, because the method which forms the subject matter of the claims of this application may be used in the effecting of separation of various gaseous mixtures.

According to a desirable method and apparatus which was disclosed and claimed in my copending application Serial No. 122,077, filed October 18, 1949, and now abandoned, it is necessary to maintain predetermined differences between pressures at different places in the oxygen generating systems therein disclosed, and this present application, a continuation-in-part of said application Serial No. 122,077, filed October 18, 1949, and now abandoned, and a continuation-in-part of my copending application Serial No. 81,589, filed March 15, 1949, and now abandoned, relates to a method in which metering devices are employed in the place of pressure reducing valves for the maintaining of the designed differences in pressure.

It is an object of the present invention to provide an improved method of separating gases in which through the use of metering devices of appropriate fixed displacement or of fixed volumetric capacity a close control of the process of gas separation may be effected. Other objects and advantages of the invention will hereinafter appear.

Before there is a description of the subject matter being particularly claimed in this application there will be given a description of the method (and an apparatus for performing that method) of which the present invention is a modification.

In the accompanying drawings in which there are first illustrated single and double column apparatus for the separation of gases, and then a double column apparatus embodying devices by which the present invention may be practiced, and finally a modified form of such a device, Fig. 1 is a diagrammatic view of a single-column gas-separation apparatus.

Fig. 3 is a similar view of a double-column apparatus, employing fixed displacement metering means to control the process of generation; and Fig. 4 is a fragmentary sectional view through a form of dispensing device which may be used in place of a metering device of the positive displacement type.

Figure 1:
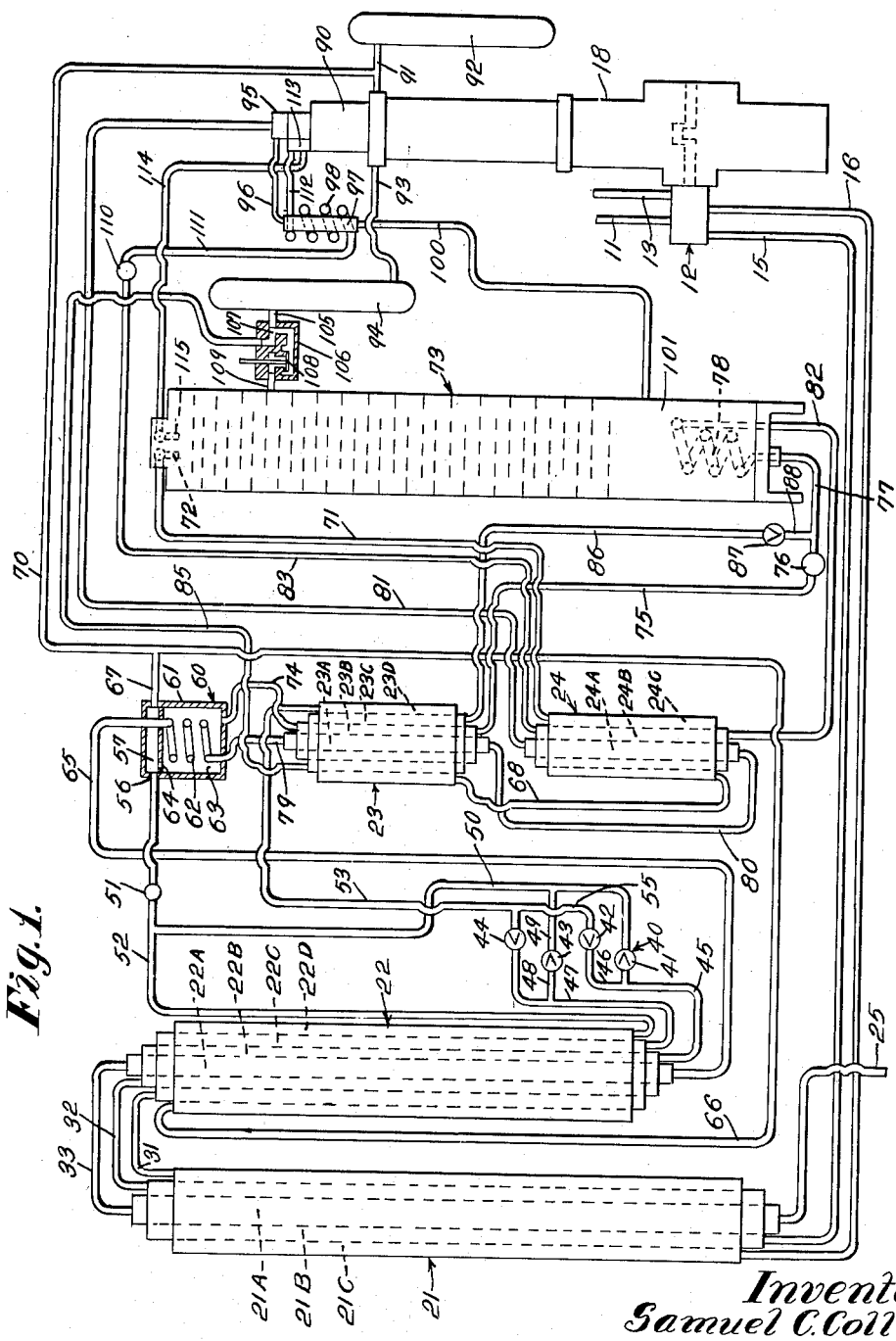

Referring first to the system shown in Fig. 1 of the drawings, air at a temperature of approximately 300° K. and a pressure of 160 p. s. i. (all pressures are gauge unless otherwise indicated) may be delivered, as from a suitable air compressor (not shown), through a conduit 11 to a valve mechanism generally designated 12, and the effluent (mainly nitrogen) leaving the apparatus may be discharged to the atmosphere through a conduit 13. The valve mechanism 12 is of the mechanically actuated type, and is periodically moved by power, and with a snap action, to reverse the connections of the conduits 11 and 13 with a pair of conduits 15 and 16 which lead from the casing of the valve mechanism 12. In the Samuel C. Collins application Serial No. 661,253, filed April 11, 1946 and which has now matured into Patent No. 2,716,333 granted August 30, 1955, there is diagrammatically shown a reversing valve mechanism suitable for the performance of the functions of the valve mechanism 12; and an example of other mechanisms suitable for this purpose forms the subject matter of Patent No. 2,638,923, granted May 19, 1953, upon an application of Win W. Paget, Serial No. 35,092, filed June 25, 1948. The power for shifting the valve mechanism 12, to effect connection of the air supply conduit 11 now with the conduit 15 and again with the conduit 16, and connection of the conduit 13 with the conduits 16 and 15 while the conduit 11 is connected with the conduits 15 and 16, may be taken from any suitable course, but is desirably taken from the drive shaft of an expansion engine 18, through any suitable reducing gearing such as that which is diagrammatically illustrated in said Collins application, Serial No. 661,253 (now Patent No. 2,716,333). Reversals are adapted to be effected at relatively short intervals; and suitable intervals may be on the order of three minutes.

Heat exchangers 21 and 22, desirably vertically disposed, and formed as separate units, instead of as one longer unit, in order to keep height within desirable limits, are arranged in series, and entering air passes through the heat exchangers 21 and 22 in the order mentioned, while leaving nitrogen passes through these same heat exchangers in the order 22, 21. Heat exchanger 21 has three courses, indicated as coaxial courses 21A, 21B, and 21C, the first the innermost course and the last the outermost; and exchanger 22 has similarly relatively arranged courses 22A, 22B and 22C, and, outside 22C, a fourth course 22D. Through two of the courses in series in the exchangers 21 and 22, to wit, courses 21B, 22B and courses 21C, 22C, the entering air and the leaving nitrogen flow alternately, the entering air flowing inwardly through one or the other of these pairs of courses and the nitrogen flowing outwardly through the one of such pairs of courses not at any given moment serving for the inflow of the air. Through the third course, 21A, of the exchanger 21 and through the corresponding course, 22A, of the exchanger 22, but in the order 22A, 21A, the leaving oxygen product is discharged. Exchanger 22 has, as above noted, a fourth course 22D, through which a portion of the air which is entering the apparatus by way of the exchangers 21, 22 is caused to recirculate through exchanger 22, the better to effect the depositing out of impurities from the entering air stream and to increase the temperature of the air entering the expansion engine.

It has been noted, with respect to the exchangers 21 and 22, and, it will be noted, with respect to further heat exchangers 23 and 24 hereinafter to be described, that the courses are indicated as being coaxial. It will, however, be appreciated that the precise form of construction of the exchangers is not illustrated in the diagram of Fig. 1, since suitable multiple-pass exchangers may assume various forms, and, in the Samuel C. Collins application and patent above identified, a suitable form of exchanger is illustrated, and other possible types are illustrated in Letters Patent Nos. 2,596,008 and 2,611,586, granted respectively on May 6, 1952, and September 23, 1952, upon other applications of said Samuel C. Collins, respectively Serial Nos. 3,217, filed January 20, 1948, and 2,877, filed January 17, 1948. Exchanger 23 will be observed shortly to be of the four-course type, and exchanger 24 of the three-course type.

Conduit 15 communicates with course 21B of exchanger 21, and conduit 16 with course 21C of exchanger 21. The leaving oxygen product passes outwardly through course 21A of exchanger 21 and passes to a shop line, to a bank of cylinders, or to any other desired point or apparatus, for use or storage, through a conduit 25. Course 21C of exchanger 21 is connected by a conduit 31 with course 22C of exchanger 22. Course 21B of exchanger 21 is connected by a conduit 32 with course 22B of exchanger 22. A conduit 33 connects course 21A of exchanger 21 with course 22A of exchanger 22. These courses are traversed serially, in the order 22A, 21A, by the oxygen product, as later described. It will be appreciated that air will flow alternately in through course 21C, conduit 31 and course 22C or course 21B, conduit 32 and course 22B, while concurrently nitrogen will flow outwardly through the ones of said courses and passages last mentioned not carrying the entering air.

A suitable automatic reversing valve mechanism, generally designated 40, is provided beyond, in terms of entering air flow, the end of heat exchanger 22 last left by the entering air and first entered by the leaving nitrogen, this including four automatic check valves 41, 42, 43 and 44. This arrangement is disclosed in the Samuel C. Collins application Serial No. 661,253 (now Patent No. 2,716,333). The lower end of course 22B has connected with it a conduit 45 which leads to the check valve 41, and a branch 46 leads from conduit 45 to check valve 42. A conduit 47 leads from course 22C to check valve 44, and a branch 48 connects conduit 47, at a point between course 22C and the check valve 44, with the check valve 43. A conduit 49 connects the other side of check valve 43 with a conduit 50 leading from the check valve 41 to a suitable restrictor device 51, which creates a slight difference between the pressure in the conduit 50 and the pressure beyond the device 51, the latter pressure being on the order of two pounds less than the pressure in conduit 50. A conduit 52 connects the conduit 50 with the bottom of course 22D. A conduit 53 leads from the side of check valve 44 opposite the conduit 47, to the outermost course of the heat exchanger 23. Nitrogen always flows outwardly through conduit 53. A conduit 55 connects the side of check valve 42 opposite the conduit 46 to the conduit 53. Each of the check valves 41, 42, 43, and 44 opens in the direction indicated by its > and prevents opposite flow.

The restrictor 51 is connected as at 56 to a chamber 57 within the top of an evaporator-condenser 60 having a suitably insulated casing 61 and having in said casing an oxygen conducting conduit or course 62 and an air conducting conduit or course 63 in close heat exchange relation with each other. The conduit or course 63 is connected at 64 with the chamber 57. The oxygen conduit or course 62 is connected by a conduit 65 with the bottom of course 22A of exchanger 22. The top of course 22D of exchanger 22 is connected by a conduit 66 with a conduit 67 leading from the chamber 57, and the reunited stream of air passes to a conduit 70, which leads to the expansion engine 18 later more fully described.

The connections of the downstream side of the restrictor 51 with the chamber 63 and with the conduit 67 have been shown as having the chamber 57 common to them, but the use of a chamber in the casing of the evaporator-condenser 60 to effect such connections is not essential.

When the air entering the system is passing through course 22B, it flows past the check valve 41. When course 22B is serving for outflow of nitrogen, the nitrogen flows from conduit 53, through conduit 55 and past check valve 42 and through conduits 46 and 45 to course 22B. When course 22C is serving for inflow of air, the entering air flows past the check valve 43. When course 22C is being used to conduct leaving nitrogen, the nitrogen flows past check valve 44 and through conduit 47. As the entering air is at a much higher pressure than the leaving nitrogen, no check valve subjected on its discharge side to air can be opened by the lower nitrogen pressure.

For best performance, as well during high pressure as during low pressure production, the arrangement of exchangers 21 and 22 herein shown and described is preferable. It is desirable that the entering air pass upward through exchanger 21 in order that the water frozen out of the entering air stream, and all of which is removed in exchanger 21, may drain by gravity downwardly in that exchanger. Exchanger 22, however, is desirably so arranged that the at least nearly completely liquid leaving oxygen stream which enters it during high pressure oxygen production shall pass upwardly therethrough. The flow of the entering air is in opposite directions through exchangers 21 and 22 in a preferred arrangement. For low pressure oxygen production and/or with constructions of exchanger 22 in which oxygen flow is suitably retarded, an arrangement may be used in which the oxygen may pass downwardly in exchanger 22 as well as in exchanger 21 while the air passes upwardly in both of the same.

The heat exchangers 23 and 24 have been previously mentioned. Exchanger 23 has four courses: a central one, 23A, a next course 23B, a third course 23C, and an outer course 23D surrounding, as shown on the drawings, course 23C. Obviously the arrangements of the courses, and the structure of this exchanger, are subject to wide structural variations. Exchanger 24 has a central course 24A, an outer course 24C and an intermediate course 24B. It too is subject to wide structural variation. It will be understood that the several courses will be in good heat exchange relation with respect to each other.

It has been noted that the conduit 53 is connected with the outermost course 23D of exchange 23. This connection is with the top of such course. The bottom of course 23D is connected by a conduit 68 with the bottom of course 24C of exchanger 24, and the top of course 24C is connected by a conduit 71 with the nitrogen outlet (the efflux connection) 72 of a single column 73. The compressed air course 63 of evaporator-condenser 60 is connected by a conduit 74 with the top of course 23B of exchanger 23. The bottom of said course is connected by a conduit 75 with a valve device 76, which, in the particular apparatus shown, and when the latter is used for oxygen production, is adjusted to effect a pressure drop between its opposite sides on the order of 88 p. s. i. for a compressor delivery pressure of 160 p. s. i. This is substantially the same reduction in pressure as occurs in the expansion engine later described, when the latter is operating with its longer period of admission, hereinafter fully explained. The downstream side of valve device 76 is connected with a conduit 77 which leads to a condenser coil or element 78 in the lower end of the column 73. The central course (as shown) 23A of exchanger 23 is connected at its top with a conduit 79 leading to the oxygen course 62 of the evaporator-condenser 60, while its bottom is connected with the bottom of central course 24A of exchanger 24 by a conduit 80. A conduit 81 leads from the top of the central course 24A. This is connected with the discharge of a liquid oxygen pump, later described. The condenser unit 78 is connected at its other end (from the conduit 77), by a conduit 82, with the intermediate course 24B of exchanger 24. The top of course 24B is connected with a conduit 83, of which more will be shortly said.

Three of the four courses of exchanger 23 have been noted. The fourth course, 23C, is connected at its top with an expanded air conduit 85, and its lower end is connected by a conduit 86, containing a check valve 87 openable towards the conduit 77 and connected with the latter by a connection 88. The check valve opens towards the conduit 77, but only when the pressure in the conduit 86 is sufficient to effect opening of check valve 87 against the pressure in conduit 77.

The expansion engine 18, which may be of the construction shown in the Samuel C. Collins application, Serial No. 665,206, filed April 26, 1946, and now matured into Patent No. 2,607,322, granted August 19, 1952, provided with suitable means for predeterminedly lengthening and shortening the period of admission, or which may be of the character of the expansion engine employing cam follower rollers one or both of which coact with a cam depending on whether early or late cutoff is desired, which expansion engine is illustrated and described in an application of Win W. Paget, Serial No. 31,017, filed June 4, 1948, and now matured into Patent No. 2,678,028 granted May 11, 1954, or of other suitable construction, includes a cylinder 90 having admission and exhaust valves, not shown, and to the admission valve of which air under pressure is admitted from the conduit 70 through a conduit 91 with which an "In" surge tank 92 is connected so as to minimize fluctuations in flow. A discharge or exhaust connection 93 leads from the expansion engine to a "Discharge" surge tank 94, which may have associated with it a strainer to catch any snow that might otherwise attain to the column while the heat exchangers 21 and 22 were not fully cooled down during the starting of the apparatus. The expansion engine supports on the top of its cylinder, a jacketed liquid oxygen pump 95 of any suitable construction, the liquid oxygen pump being for example actuated by the expansion engine piston as is the pump shown in the last above mentioned application (Patent No. 2,678,028) of Win W. Paget, or in any other suitable manner; and it may be noted that the conduit 81 is connected with the discharge of the liquid oxygen pump 95, while this pump has a suction connection 96 leading to it from a strainer 97 which is cooled or jacketed by liquid air, the jacket herein being represented by a coil 98. To the strainer 97 a conduit 100 leads from the evaporator-condenser at the bottom of the column 73, the conduit 100 communicating with the condenser-unit-enclosing chamber 101 in the bottom of the column at a point at the desired liquid oxygen level in the latter.

The "Discharge" surge chamber 94 has connected with it a conduit 105 which is connected to a valve structure 106, which valve structure includes a passage or chamber 107 continuously in communication with the conduit 85, and another chamber connected through a conduit 109 directly with the interior of the column at a point spaced an appropriate distance from the top of the latter. The valve structure 106, which may be called a bypass valve, is adapted to have the two chambers mentioned connected in communication with each other, and thus to connect the "Discharge" surge chamber 94 in free communication with the upper part of the column through the conduit 105, valve structure 106, and conduit 109. In the drawing the constant communication between the conduits 105 and 85 is indicated by the passage 107, and the communicability of the passage or chamber 107 with the conduit 109 is indicated by the valve 108. Other constructions suited to the functions mentioned may evidently be used.

The expansion engine 18 is provided, in the present particular apparatus, with valve gear adapted to permit the engine to operate with admission for a relatively short portion of its working stroke, or with admission for a considerably longer portion of its working stroke. As will later be explained more in detail, when cutoff is relatively late in the working stroke to provide said long admission, the valve structure 106 will prevent communication between the "Discharge" surge chamber 94 and the column through the conduit 109; and when communication between the "Discharge" surge chamber 94 and the column is effected by the appropriate adjustment of the valve structure 106, the expansion engine will be operated with admission for said relatively short portion of its working stroke.

Various means can be provided for effecting the desired changes in period of admission, as, for example, with a cam opened admission valve as shown in the Samuel C. Collins Patent No. 2,607,322, granted August 19, 1952, the provision of selectively operable cams with different dwells, or cams one relatively adjustable with respect to the other. See also for example Ferguson, 2,221,790, patented November 19, 1940. Or cam-follower rollers one or both cooperating with a cam depending on whether early or later cutoff is desired may be employed, as in the apparatus of the Paget Expansion Engine application.

Only such air will flow through the evaporator-condenser 60 as cannot pass through the expansion engine. During 50-pound oxygen production, complete condensation of the fraction of air passing through the air course 63 of the evaporator-condenser 60 may conceivably be effected, but if more air passes through this course than can be condensed by the available cold provided by evaporation of liquid oxygen, at a pressure on the order of 50 p. s. i. in the course 62 of the evaporator-condenser 60, the excess unliquefied air will be condensed in evaporator-condenser 78.

The conduit 83, previously mentioned, leads to a valve device 110 which is adapted to be adjusted to effect a reduction on the order of 60 p. s. i. in the pressure of the fluid (liquid air) which flows through it; and the downstream side of the valve device 110 is connected by a conduit 111 with the jacket 98 for the strainer 97; and the top of this jacket is connected by a conduit 112 with a jacket 113 of the liquid oxygen pump 95, there being a conduit 114 leading from the jacket 113 to a connection 115 through which liquid air may be admitted to the top of the column 73.

The column 73 may be of any suitable construction, and is illustrated as of the conventional packed type. It may obviously assume various forms, and the now abandoned Samuel C. Collins application, Serial No. 26,395, filed May 11, 1948, and the Samuel C. Collins Patent No. 2,610,046, granted September 9, 1952, show columns which are well adapted for the purpose for which the present column is employed.

Before describing in detail the mode of operation of the apparatus shown in Fig. 1, it is desired to point out that the column may normally be operated with a pressure on the order of 6 or 7 p. s. i., and in order to evaporate liquid oxygen with the latent heat of condensation of air under pressure in the condenser 78, the pressure of the air in said condenser should be on the order of 70 p. s. i., and accordingly the valve 110 will be set to maintain a differential in pressure of about 60 p. s. i. between its upstream and downstream sides, the downstream side being substantially at column pressure, and the upstream side substantially at a pressure of 70 p. s. i. The expansion engine, when working with the later cutoff, has an expansion through it at least substantially equal to the difference between 158 p. s. i., the pressure in line 70, and the pressure in the line 77. Thus the expansion engine provides a pressure drop on the order of 88 p. s. i. This 88 p. s. i. drop, plus the 70 p. s. i. pressure previously mentioned, plus the differential in pressure of about 2 p. s. i. provided by the restrictor 51, gives a cumulative pressure of 160 p. s. i.; and that is the pressure at which the two-stage compressor, not shown, which delivers air to the conduit 11, may deliver air continuously. It is to be noted that the conduit 75 and valve device 76 are substantially in parallel with the expansion engine and the check valve 87, and accordingly the valve device 76 is set to give a pressure reduction on the order of 88 p. s. i., so that the air starting at 158 p. s. i. in the chamber 57 and passing through the air course 63, conduit 74, heat exchanger course 23B, conduit 75 and past valve device 76 may attain to the pipe 77 at substantially the pressure at which the air is delivered through the conduit 88. Thus, it may be observed that the sum of the column pressure, plus the reduction in pressure at the valve device 110, plus the pressure reduction across the valve device 76, plus the 2 p. s. i. drop through the restrictor 51 and plus the resistance in various conduits also equals 160 p. s. i., the delivery pressure of the compressor supplying compressed air to the conduit 11.

Another valuable function of passing a portion of the entering air through the evaporator-condenser resides in the fact that under varying conditions, the expansion engine, though it may normally take a certain percentage of the air to be processed, may at times take somewhat larger quantities; by having a substantial stream of air normally passing through the evaporator-condenser, there is available, in the event the expansion engine requires more air by virtue of fortuitous changes in operating conditions, air in the system which can be diverted and supplied to the expansion engine and so enable the supply pressure to the latter to be maintained constant.

The mode of operation of the described apparatus during the production of oxygen is different, depending upon whether 50-pound oxygen or oxygen suitable for cylinder charging (say at 2000 p. s. i.) is being produced. Oxygen at either pressure may be delivered. The mode of operation for the production of oxygen at 50 p. s. i. pressure will be described first, and then the differences when oxygen at 2000 p. s. i. is to be the product will be explained. Following this, a procedure to set the plant in operation will be described.

Air is supplied continuously, as above noted, through the conduit 11 at 300° K. and 160 p. s. i., from any suitable compressor. Ordinarily a two-stage compressor with an aftercooler may be used as the source of air supply.

The entering air contains water vapor and carbon dioxide. These are caused to be separated out of the air stream by cold supplied by the leaving streams of oxygen product and nitrogen. The carbon dioxide is largely deposited in the heat exchanger 22 upon the walls of the courses 22B and 22C, and the water vapor, as liquid water and as ice, in the courses 21B and 21C of exchanger 21; and it may be of interest at the present moment to point out that the liquid oxygen drawn from the chamber 101 in the column 73 through conduit 100, the strainer 97, and conduit 96, is pumped by the liquid oxygen pump 95 through the conduit 81, through the course 24A of heat exchanger 24, through the conduit 80, the course 23A of heat exchanger 23, conduit 79, the oxygen course 62 of the evaporator-condenser 60, the conduit 65, course 22A of heat exchanger 22, conduit 33, and the course 21A of the heat exchanger 21, and finally is delivered at the desired terminal pressure through the product delivery pipe 25. As has been previously pointed out, the nitrogen leaving the column by way of the connection 72 passes through the conduit 71, through course 24C of heat exchanger 24, through conduit 68, through course 23D of heat exchanger 23, through conduit 53, through one or the other of the courses 22B or 22C of heat exchanger 22, through one or the other of the conduits 31 or 32, through one or the other of the courses 21B or 21C of heat exchanger 21, through one or the other of the conduits 15 or 16, and through the escape 13, having passed through appropriate passage means in the valve mechanism 12. Thus it will be evident that the streams of oxygen and nitrogen passing through the heat exchangers 22 and 21 will cause the carbon dioxide and water vapor to be condensed, or condensed and frozen, on the walls of the passages in these exchangers through which the entering air may at any given moment be flowing, and that liquid water will be evaporated or entrained, and deposits of ice and carbon dioxide snow sublimed, and be carried out, by the leaving nitrogen stream, of the passages in which they have been deposited. A portion of the air which is passed through the heat exchangers 21 and 22 is caused to pass again through the heat exchanger 22, through the course 22D thereof, as previously explained, flowing through the conduit 52, course 22D, and conduit 66 and rejoining the main mass of air which passes, during the production of low pressure oxygen, through the chamber 57 and conduit 67; and the reunited streams pass through the conduit 70 and the conduit 91 into the expansion engine to be expanded therein and to be cooled by the performance of work during the adiabatic expansion of the fluid in the expansion engine. The flow through conduit 52, course 22D of heat exchanger 22, and conduit 66 is caused by the device 51, which provides approximately a 2-pound difference in pressure at its opposite sides.

At this point it may be noted that, regardless of the pressure of the delivered product, some of the air supplied to the apparatus for treatment therein always passes through the expansion engine 18, and some of the air always passes through evaporator-condenser 60, the quantity of air passing through evaporator-condenser 60 being determined by the cutoff of the expansion engine. When the expansion engine operates with relatively early cutoff, more air necessarily passes through evaporator-condenser 60. During the production of oxygen at 50 p. s. i., about 12% of the total mass of entering air passes through the air course 63 of evaporator-condenser 60 in heat exchange relation with the leaving oxygen product. When oxygen at 2000 p. s. i. is the desired product, as much as 60% of all the air may pass through the air course 63 of evaporator-condenser 60. The air which leaves the heat exchanger 22 on its way to pass through the chamber 57 of evaporator-condenser 60 and flow through the conduit 67 is at a temperature of 115° K. and a pressure of 160 p. s. i. At the downstream side of the restrictor device 51 the pressure is 158 p. s. i. The recirculated air which flows through the conduit 66 is at a pressure of on the order of 158 p. s. i. and a temperature of 180° K. just before it joins the fluid stream in conduit 67. When the streams have been mingled in the conduit 70, all the air is at a temperature of 135° K. and a pressure of 158 p. s. i. The portion of the air which flows through the conduit 70 and does work in the expansion engine leaves the latter at a temperature of 110° K. and a pressure of 70 p. s. i. when 50-pound oxygen is to be produced. This expanded air passes through the conduit 85, through course 23C of heat exchanger 23, and emerges at a temperature of 105° K. and a pressure of 70 p. s. i., and passes the check valve 87 to mix with liquid air which has passed the valved device 76, and there is formed a stream partially of liquid air and partially of expanded air at a temperature of 100° K. and a pressure of 70 p. s. i. It may be observed that the air from the air course 63 of the evaporator-condenser 60 emerges from heat exchanger 23 and enters the conduit 75 at a temperature of 112° K. and a pressure of 158 p. s. i. After passing through the valve device 76 and undergoing a drop in pressure of about 88 p. s. i., the liquid air is at the same pressure as the expanded air coming through conduit 86.

The mixture of liquid air and expanded air at a temperature of 100° K. and a pressure of 70 p. s. i. enters the condenser coil 78 and is condensed by reason of the giving up of heat in the process of vaporizing oxygen in the bottom of the column. The liquid air emerging from the condenser 78 is at a temperature of 96° K. and a pressure of 70 p. s. i., and after this liquid air has passed the valve device 110 and had its pressure reduced by approximately 60 p. s. i., the liquid air will be at a temperature of 83° K. and a pressure of about 9 p. s. i. Following the jacketing of the oxygen strainer 97 and the liquid oxygen pump 95, the still liquid air will enter the top of the column at a temperature of 83° K. and a pressure of about 7 p. s. i., and it will be rectified therein so that substantially pure oxygen (99.5% pure, at least) can be drawn from an appropriate point in the evaporator-condenser arranged in the bottom of the column at a temperature of 95° K. and a pressure of 7 p. s. i., or perhaps less. This liquid oxygen will flow through the strainer 97, conduit 96, the liquid oxygen pump 95, the conduit 81, and the central courses, in series, of heat exchanger 24, heat exchanger 23, evaporator-condenser 60, heat exchanger 22, and heat exchanger 21, and emerge, when 50-pound oxygen is being produced, in the form of gaseous oxygen at the mouth of the product pipe 25.

When oxygen for cylinder charging is to be produced, the valve structure 106 will be operated to connect the conduits 105 and 109 and the expanded air leaving the expansion engine will then pass through the conduit 105, the valve structure 106, and the conduit 109 into the column, and the pressure of the air in the conduit 105 will be reduced substantially to that within the column, and accordingly no more expanded air will be discharged through the check valve 87, because this valve will be held closed by the pressure, on the order of 70 p. s. i., which subsists in the conduit 77. At the time the valve structure 106 is operated to permit the exhaust from the expansion engine to pass substantially directly into the column through the conduit 109, the point of cutoff of the expansion engine 18 will be changed to make it much earlier in the stroke; and, the speed of the expansion engine remaining unaltered, much less—roughly half as much—air can go through the expansion engine. As a result of this, the air which cannot flow through the conduit 67 and be passed through the expansion engine will of necessity go through the air course 63 of evaporator-condenser 60, and, having passed through course 23B of heat exchanger 23, this now much larger mass of air, perhaps 60% of the total mass, will pass through the valve device 76 and enter the condenser coil 78 of the evaporator-condenser at the bottom of the column 73 and be liquefied therein. This larger volume could not be liquefied in the evaporator-condenser 60 and the heat exchanger 23 because the oxygen now at a much higher pressure cannot be vaporized at the temperature of condensing air. The reduced volume of liquid air from condenser coil 78 will pass through the heat exchanger 24 by way of course 24B and next pass through conduit 83 and the valve device 110 and then, after jacketing the strainer 97 and the liquid oxygen pump 95, will be passed into the top of the column for rectification. A much smaller percentage of the total oxygen content of the air entering the apparatus will be delivered during the production of 2000-pound oxygen than during the production of 50-pound oxygen.

In starting up the apparatus, the valve 108 will be open and for a considerable period, on the order of two hours, and the expansion engine will be operated with relatively late cutoff. This will mean that most of the air will pass through the expansion engine, a desirable thing at this time because there would be no oxygen to effect condensation of air in evaporator-condenser 60. The entering air through whichever courses of heat exchangers 21 and 22 it may pass, will, about 12% of it, flow through the evaporator-condenser 60, heat exchanger 23, valve device 76, condensing unit 78, exchanger 24, conduit 83, and past the valve device 110 through the jacket for the oxygen strainer 97, the jacket 113 for the liquid oxygen pump 95, and then through the conduit 114 and connection 115 into the top of the column 73. During a considerable portion of the starting operation—the cooling down period—this air will simply flow out through the conduit 71, etc. and be discharged. The relatively large amount, about 88%, of the air which passes through the expansion engine 18 will pass into the column through the conduit 109, and it too will discharge through the conduit 71 to the atmosphere. As the unit cools down, a little liquid will commence to form, and as soon as this stage is reached, the expansion engine will be shifted to early cutoff, thus increasing the refrigeration, and for another period, perhaps an hour, the exhaust from the expansion engine will still continue to be discharged through the connection 109 into the column. When the liquid finally builds up high enough so that oxygen can be drawn through the conduit 100, the apparatus will be all ready to go to 2000-pound oxygen production, or, by closing the valve 108 and making the point of cutoff in the expansion engine much later, 50-pound oxygen can be produced. It will be noted that during the later stages of the cooling down operations, the bypass valve 108 will still be open and the expansion engine will be working with an early cutoff, and that when the liquid level in the column reaches the overflow point, the machine will be ready to fill cylinders, but if 50-pound oxygen be desired, the bypass valve can be closed and the valve gear arranged in the expansion engine for late cutoff.

Certain points not previously mentioned, or perhaps deserving reemphasizing, may be noted now with respect to the apparatus, which has so far been described. The motion of the recirculating air flowing through the conduit 52 is counterflow relative to the entering air stream, and, as previously observed, it is caused to take place by providing a slightly less resistance to flow through the course 22D of heat exchanger 22 than to flow past the device 51 and through the chamber 57 of evaporator-condenser 60.

As a portion—a minimum of about 12%—of the entering air always passes during normal operation through the evaporator-condenser 60 in heat exchange relation with the fluid flowing through the oxygen product line, there will always, as soon as low enough temperatures are attained, be some liquid passing into the top of the column.

During the cooling down period, and also when oxygen at 2000 p. s. i. is the desired product, the expanded air may enter the column through the valve controlled connection 109 at a point perhaps three-quarters of the way up the column, instead of having to pass around through heat exchanger 23, the conduit 86 and the check valve 87. Indeed, no air can then pass through the circuit last mentioned, because the air in the conduit 77 will be at a pressure so much greater than the pressure in conduit 86, as to maintain the check valve closed.

During the production of 50-pound oxygen, the main flow of expanded air (about 88% of the total entering air) passes into the top of course 23C of heat exchanger 23 and passes down through this heat exchanger in heat exchange relation both with liquid oxygen produced in the system and with the leaving nitrogen stream. The expanded air, at 105° K. and 70 p. s. i. pressure—the same pressure as at release from the expansion engine—then passes through the one-way check valve 87 and enters the condenser unit 78 in the bottom of the column, and the expanded air is condensed, its latent heat of condensation serving to evaporate liquid oxygen at a lower pressure in the bottom of the column. The liquefied air goes into the bottom of heat exchanger 24 and gives up some of its heat to the nitrogen and to the liquid oxygen which also flows through exchanger 24, and then passes through the valve device 110, which causes a reduction in pressure on the order of 60 p. s. i., this resulting in a further cooling of the liquid air and some vaporization. After passing around the liquid oxygen filter which it jackets, the liquid air is used, as will be recalled, to jacket the liquid oxygen pump also, and it then enters the top of the column at a temperature of 83° K. and at a pressure of on the order of 7 p. s. i. The process of rectification in the column results in there being available liquid oxygen in the evaporator-condenser at the bottom of the column, specifically in the chamber 101 surrounding the condenser unit 78, at a temperature of about 95° K. and a pressure of around 7 p. s. i., while nitrogen, with the single column rectifier, containing from 7 to 10% oxygen, and at a temperature of 83° K. and a pressure of 7 p. s. i., passes out of the top of the column. The liquid oxygen is filtered as it passes to the liquid oxygen pump and is forced by the latter at a pressure commensurate with the desired product pressure successively through heat exchanger 24, heat exchanger 23, evaporator-condenser 60, heat exchanger 22, and heat exchanger 21 to the point of product delivery, absorbing from the entering air stream the heat necessary to vaporize it, when 50-pound oxygen is being produced, while passing through evaporator-condenser 60, and the absorbed heat resulting in a change of state of the entering air from gaseous to liquid form. When 2000-pound oxygen is being produced, the liquid oxygen cannot be evaporated in the evaporator-condenser 60 and so there is simply a temperature increase of a few degrees in the oxygen passing through evaporator-condenser 60, the evaporator-condenser 60 then operating simply as a heat exchanger. Nevertheless, when oxygen at 2000 p. s. i. pressure reaches the cylinders to which product line 25 may be connected, this oxygen is in a vapor state. The valve devices 76 and 110 will be adjusted as necessary to effect the desired operating characteristics at all times and at whatever product pressure.

During the production of 50-pound oxygen, the portion of the air that splits off from the main stream in the header of evaporator-condenser 60—an amount which may be 12% of the whole during normal 50-pound oxygen production—is largely condensed in evaporator-condenser 60 and any excess that may pass through the evaporator-condenser 60 without liquefaction will be liquefied in the evaporator coil 78. If 2000-pound oxygen is the product, no expanded air enters the evaporator-condenser 78 with the air going by way of exchanger 23 from the evaporator-condenser 60, as the low pressure of the expanded air—this air has been expanded through a much greater range of expansion when the expansion engine is working with early cutoff—will not permit it to effect opening of the check valve 87 even though the exhaust from the expansion engine communicates freely with the check valve 87. Note that the exhaust from the expansion engine communicates freely through the conduit 109 with the column at this time. The larger quantity of air going through the evaporator-condenser 60 and heat exchanger 23 and entering the condenser 78, even though little of it may have been condensed before the arrival at the condenser 78, is at a pressure of 70 p. s. i. suited for condensation by the latent heat of evaporation of oxygen which is vaporized in the chamber 101. The total quantity of oxygen produced when 2000-pound oxygen is being supplied will be proportionately much less than when 50-pound oxygen is the end product. It may be noted that the exhaust pressure of the expansion engine during the production of 2000-pound oxygen will be essentially the same as column pressure, namely 7 p. s. i.

Roughly, during cylinder charging (2000-pound production) 40% of the air goes through the expansion engine and directly into the column, while the other 60% follows the course normally taken during 50-pound oxygen production by but 12% of the air supply to the apparatus. This change in the air flow distribution is due to the much earlier cutoff which occurs during 2000-pound oxygen production. It will be understood that the expansion engine operates at a predetermined speed, that the quantity of fluid which can pass through it is accordingly determined by the point of cutoff, and that, accordingly, with late cutoff, a much larger percentage of the total entering air stream can pass through the expansion engine than when cutoff is made early.

With an apparatus having, during low pressure oxygen production, the temperatures and pressures above mentioned, the relatively later cutoff of the expansion engine would theoretically take place at about 70% of the working stroke; and during high pressure oxygen production the relatively early cutoff would be at theoretically on the order of 25% of the working stroke, but these percentages are only illustrative. For example, there are two factors which in practice would tend to call for later cutoff in both modes of operation, namely, that it is desirable in practice to handle at least a little larger than the theoretical mass of air to insure adequate refrigeration, and, moreover, with actual apparatus, the expected temperatures and pressures are not always attained.

By sending the expanded air through the top three or four trays of the column, the liquid air flowing downward can be caused to wash a fraction of the oxygen from the expanded air.

During the production of 50-pound oxygen, the percentage of oxygen in the waste gas leaving the top of the column is approximately 10% and theoretically might be as low as 7%. The percentage of oxygen in the liquid air which is fed into the top of the column is approximately 21%. The percentage of oxygen in the liquid which is in equilibrium with gaseous air of 21% oxygen is approximately 47%. As long as descending liquid has less than 47% oxygen in it, it can extract some oxygen from air passing directly into the column.

Refrigeration is obtained from the Joule-Thomson effect, and from the operation of the expansion engine. The Joule-Thomson effect gives approximately 2° K. of cooling. During normal 50-pound production, 12° K. of cooling is obtained from the expansion engine. When filling cylinders (producing oxygen at 2000 p. s. i.), the expansion engine provides 42° K. cooling of the air which passes through it, but only 40% of the total air stream passes through the expansion engine. The 2° K. of cooling obtained by the Joule-Thomson effect as well as the 12° K. cooling obtained from the expansion engine applies to the flowing stream of entering air.

The nitrogen, as above noted, was at 83° K., and a pressure of 7 p. s. i. in conduit 71. In conduit 53 it is at 109° K. and 5 p. s. i. Between the exchangers 22 and 21 it is at 176° K. and 3 p. s. i. The leaving oxygen product is at 178° K. between the heat exchangers 22 and 21, and in the conduit 65 is at 110° K. The entering air between heat exchangers 21 and 22 is at 184° K. and 160 p. s. i. All pressures and temperatures are, of course, approximate.

Figure 2:
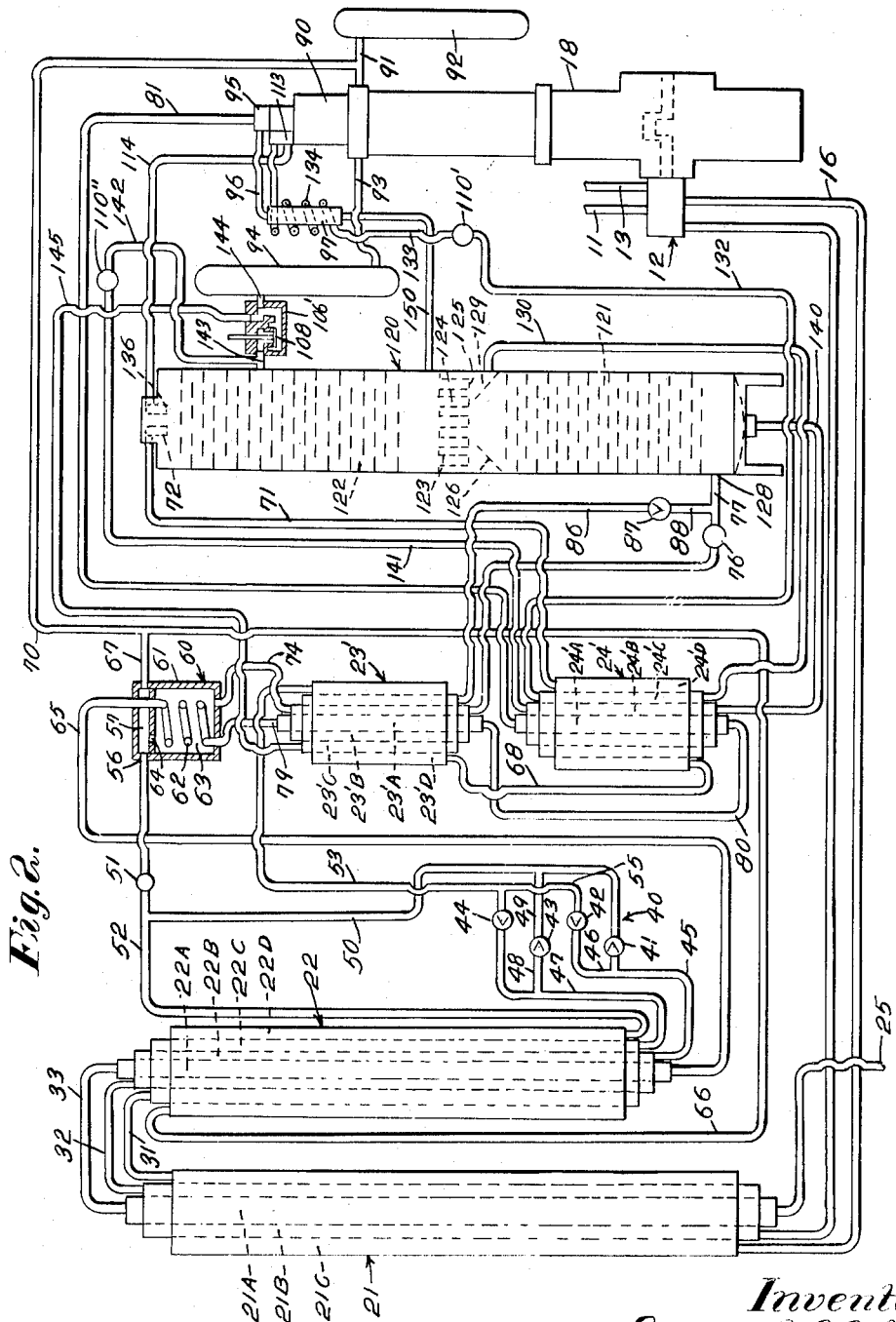
Fig. 2 is a similar view of a double-column gas-separation apparatus.

Fig. 2 discloses an oxygen generator incorporating a double column 120 instead of a single column, and this generator is claimed in my application Serial No. 383,436, filed of even date herewith and now Patent No. 2,685,182 granted August 3, 1954, and which is a division of application Serial No. 122,077, filed October 18, 1949, and now abandoned, and bears a like relation, so far as it contains subject matter common to it and to Serial No. 122,077 (now abandoned), as does Serial No. 122,077, now abandoned, to each of the following applications: Serial No. 81,589, filed March 15, 1949 and Serial No. 30,388, filed June 1, 1948, both now abandoned. The principal differences will be noted, as the description proceeds, to reside in the use of a double column and the changes to which the use of a double column give rise.

The column 120 includes a high pressure chamber or section 121 and a low pressure chamber or section 122, and these are separated by a partition wall 123 which is provided with a plurality of depending heat exchange elements 124 open at their ends communicating with the chamber 122 and closed at their bottom ends 125. An inclined annular wall 126 projects inwardly at the top of the high pressure chamber 121 and underlies a substantial number of the depending heat exchange elements 124. The conduit 77 in Fig. 2 bears the same relation to the check valve 87 and to the valve device 76 which it bears in Fig. 1, but it communicates at 128 with the high pressure chamber 121 of the double column, near the bottom of that chamber. Accordingly, liquid air and expanded air pass into the bottom of the high pressure chamber 121 in a united stream. When the apparatus is operating to produce oxygen, substantially pure nitrogen (about 98% pure) drips from the heat exchanger elements 124, and a portion of it is collected in an annular trough 129 which is formed between the annular sloping wall 126 and the outer wall of the column. From this trough 129 a conduit 130 conducts the liquid nitrogen to a heat exchanger 24' (a four-course one), and the nearly pure nitrogen passes through the course 24'C of this heat exchanger and then passes through a conduit 132 and a valve device 110', and from the latter through a conduit 133 to a cooling coil or jacket 134 surrounding the strainer 97 for liquid oxygen. The cooling coil 134 is connected in series with a jacket 113 for the liquid oxygen pump, and from this jacket a conduit 114 leads to a connecting device 136 arranged in the top of the column's low pressure chamber 122. From the bottom of the high pressure chamber 121 of the double column 120, a conduit 140 leads to the course 24′B of heat exchanger 24′, and from this course the enriched air which is formed in the chamber 121 by a process of partial rectification therein is delivered through a conduit 141 to a valve device 110″ whose other side is connected by a conduit 142 with the connection 143 leading from a conduit 144 connected with the "Discharge" surge chamber 94 and also connected through the casing of a bypass valve structure 106′ with a conduit 145 which is connected with the course 23′C of a heat exchanger 23′. The other end of the course 23′C is connected with the conduit 86 which leads to the check valve 87 and to the conduit 88 which communicates with the conduit 77 at a point in the latter just beyond the valve device 76. The liquid oxygen pump 95 takes liquid oxygen from the chamber 122 via a conduit 150 and the strainer 97 and discharges it through a conduit 81 into the top of course 24′A of heat exchanger 24′ and a conduit 80, the course 23′A of heat exchanger 23′, conduit 79, oxygen course 62 of evaporator-condenser 60, conduit 65, course 22A of heat exchanger 22, conduit 33, and course 21A of heat exchanger 21, delivering the oxygen pumped by the oxygen pump 95 to the delivery conduit 25.

The mode of operation of this apparatus differs from that first described essentially only in particulars which grow out of the employment of a double column instead of a single column. The valve devices 110′ and 110″ each control the flow of one of the fluids which originated in the high pressure chamber 121 of the double column. They are therefore quite similar in construction and effect like reductions of pressure, herein approximately 75 p. s. i. One of them has the fluid passing from its downstream side into the low pressure chamber 122 of the double column at a point somewhat lower in that chamber than the other, as will be noted. The nearly pure nitrogen passes through the conduit 130, through course 24′C of heat exchanger 24′, through conduit 132, through valve device 110′, conduit 133, cooling coil 134, jacket 113, conduit 114, and through the connection 136 into the top of the upper section of the double column. The enriched air passes through the conduit 140, course 24′B of exchanger 24′, conduit 141, valve device 110″, conduit 142, and conduit 143 into the chamber 122.

Rectification takes place in the manner common to double columns in the two compartments of column 120. That nitrogen is nearly pure (98%) by reason of the rectification process which goes on in chamber 121 has been mentioned. Enriched air that leaves the bottom of the chamber 121 contains from 40 to 50% oxygen. The pressure in the lower section 121 may be between 75 and 85 p. s. i.; the pressure in the upper section 122 from 5 to 10 p. s. i. The pure oxygen drawn off from the bottom of chamber 122 may desirably be pumped at a pressure of approximately 50 p. s. i. through course 24′A of exchanger 24′, conduit 80, course 23′A of exchanger 23′, and conduit 79 into the oxygen course 62 of evaporator-condenser 60. At this pressure the saturation temperature of the oxygen will be a just little below the saturation temperature of the inflowing air, at 158 p. s. i. Accordingly there will be, with the quantity of compressed air which flows during low pressure, 50-pound oxygen production, to wit, 12% of the whole, vaporization of the leaving oxygen and at least substantially complete liquefaction of the air which passes through the evaporator-condenser 60. However, if complete liquefaction of this air does not occur, such liquefaction will take place in the high pressure chamber 121 of the double column.

In this apparatus as well as in that previously described, it will be clear that the pressure drop in the expansion engine and the pressure drop caused by the valve device 110″, the pressure drop at the restrictor 51, and the pressure in the chamber 122 of the column cumulatively amount to the pressure at which air is supplied to the system from the compressor. Likewise, in the parallel connection, the restrictor 51 with its 2 p. s. i. pressure drop, the valve device 76 with its 88 p. s. i. pressure drop, the valve device 110′ with its 60 p. s. i. pressure drop, and the pressure in the low pressure chamber 122 cumulatively equal the supply pressure.

It will be clear from what has been said that in the apparatus just described, as well as in the first, there is conservation of refrigeration in a highly desirable manner. As above noted, compressed air at 160 p. s. i. may be condensed when the temperature is reduced to say 112° K. when brought into heat transfer relation with liquid oxygen at a pressure of 50 p. s. i. and a temperature of 107° K. By pumping the liquid oxygen from the column and increasing its pressure to the value given, and bringing it into heat transfer relation with the entering air in the evaporator-condenser 60, about 12% of the entering air can be liquefied, and during normal 50-pound oxygen production, the periods of admission of the expansion engine may be so predetermined that just about 12% of the entering air will not be capable of passing through the expansion engine and will be caused to flow through evaporator-condenser 60. If all this air is not liquefied in this evaporator-condenser, this will do no harm because the air will be condensed in the evaporator-condenser at the bottom of the column, in the single column apparatus, and no harm will be done in the double column apparatus either. If an oxygen product at an excess of 50 p. s. i. were desired but in gaseous form, a much smaller oxygen compressor would be required with the use of my invention than if the initial pressurization were not effected on the liquid oxygen. Appropriate valve device adjustments will be made as necessary whether the occasion therefor be fluctuating conditions or changes in product pressure.

Instead of using the valve devices 110′ and 110″ it is possible to employ positive displacement, mechanical metering devices 151 and 152 (see Fig. 3) with mechanically opened valves. With fixed displacement metering devices the liquid nitrogen leaving the column chamber 121 through the conduit 130 must not be subjected to heat exchange with other streams in heat exchanger 24. Because of its lower boiling point, it would be completely evaporated by excess air vapor flowing from the chamber 121 through conduit 140 which would condense in exchanger 24 at the expense of the nitrogen. Accordingly, since the metering devices are intended to transmit by far the greatest portions of the masses of fluid passing through them, in a liquid state, a mere substitution in the layout of Fig. 2 of a metering device so that the fluid in conduit 132 could pass through it instead of through the valve device 110′ would not suffice. Therefore, while the device 151 is shown in a position to pass fluid in a path parallel to that controlled by the device 110′, it has an inlet valve controlled connection 153 through a valve 163 later again mentioned with the conduit 130 near the exit of the latter from the trough 126, and another stop valve S is desirably arranged in the conduit 130 just beyond the connection 153 with the latter. The connection 132 desirably has a stop valve 160, later mentioned again, arranged in it ahead of the valve device 110′. The device 151 has a discharge valve controlled discharge conduit 154 communicating with the connection 133 between the valve device 110′ and the cooling coil 134. The device 152 has an inlet valve controlled intake connection 156 connected with the conduit 141, and a discharge valve controlled discharge conduit 157 delivering to the line 142. Thus the device 152 is in a parallel circuit with the valve device 110″. The metering devices and the valve devices with which they are respectively in parallel will not be used concurrently, and the metering devices are to be regarded as alternatives for the valve devices. These metering devices will be made with displacements slightly greater than requisite to handle the maximum volumes of liquid which will pass through them from the respective points from which they take fluid. That is, they will have measuring chambers which will be filled and emptied a definite number of times in a unit of time, and the product of their volumes multiplied by the number of times they fill and are emptied in a unit of time will exceed, but only slightly, the volume of the liquid they are to meter produced in such unit of time. If they keep the liquid level down and tend to draw some vapor, the effect on the system will be very slight, because the volume of the vapor as compared with the volume of the liquid under similar pressure and temperature conditions will be so very large that little interference with the intended mode of operation of the apparatus will be possible. The valve devices 110' and 110'' may be of such construction as to permit their being brought to and maintained in closed positions when the metering devices are to be employed, or they may have stop valves, as at 160 and 161, arranged to permit their being shut off from the associated conduits at their upstream sides. The metering devices, since they have valves—both intake and discharge—which, similarly to the valves of the expansion engine of the Samuel C. Collins Patent No. 2,607,322, granted August 19, 1952, require positive opening by associated valve gear when handling fluids at the pressures for which they are designed, do not require the provision of stop valves in their respective suction lines when not in use, but there may desirably be provided stop valves 163, associated with device 151, and 164, associated with device 152, for closing such lines when it is desired to control the system with the valve devices 110' and 110''. Other suitable types of inlet and discharge valves may be employed, in place of the valves of the type of said Patent No. 2,607,322.

When the valve devices 110' and 110'' are not being employed, but instead the positive displacement metering devices 151 and 152, it will be observed that the conduit 141 associated with device 152 constitutes a suction line communicating ultimately with the bottom of the chamber 121 through the conduit 140, and the discharge line of the positive displacement device 152 communicates with the line 142 leading to the connection 143. With this construction, the conduit 153 and a portion of the communicating conduit 130 constitute the intake line for the device 151, and the discharge line from this device is numbered 154. The devices 151 and 152 may have any suitable driving means. They are driven at constant speed and are of the positive displacement type. Their displacements at their operating speeds slightly exceed the maximum quantities of liquid which they may respectively be called upon to pass through them. If they were given a displacement even twice that of the maximum quantity of liquid which they are likely to have occasion to transfer, this would be all right, because the volumes of the vapors of the uncondensed liquids are so very much greater than the volumes of the liquids, that there would be no danger of substantially upsetting the cycle. Nevertheless, the slight excess of displacement over the maximum volumes of liquid which may require displacement completely insures against possibility of either section of the column filling up with liquid and becoming logged. The valve device 110 may also be replaced by a metering device having an appropriate constant mean displacement rate slightly exceeding the rate at which liquid becomes available in the condenser 78, said metering device being located to handle liquid air and said metering device and said valve 110 each being suitably bypassed when not in use.

Other forms of dispensing devices may be used in place of the metering devices 151 and 152. The flow is from high pressure to low. It is therefore necessary to employ valve devices which cannot be opened by normally encountered fluid pressures. The provision of two valve devices (though their equivalent in a single device would suffice) is desirable in order that one valve may permit flow of fluid for a desired period into a chamber from which it is later to be dispensed to a lower pressure point, and in order that the other valve may determine the time of initiation and the duration of the dispensing to the lower pressure point. In Fig. 4 I have illustrated a suitable arrangement. This arrangement is shown as a dispensing device 165 including a transfer or measuring chamber 166 which valves 167 and 168 are respectively adapted to connect with a higher pressure line such as the line 130 or the line 141 and with a lower pressure line such as the line 154 or the line 142. The valves, normally closed by springs 169 and 170, are periodically opened and closed, as under the control of cam type devices including cams 171 and 172 turning at like angular rates and coacting with bell cranks 173 and 174 cooperating with valve stems 175 and 176. As such cam type mechanisms are obviously capable of assuming many forms in practice they need not be illustrated in detail here and are but diagrammatically shown. The valve opening devices open the valves and permit (as illustrated) their closure with the same frequency, but the valves are not both open at the same time. When one valve is open, the other is always closed. Ordinarily a discharge period longer than the supply period for the chamber may be desirable.

The chamber 166 may be varied in size. The larger it is, the less frequently any valve will have to be opened. If, however, the chambers are made too large, and the number of openings are made correspondingly lower, the performance of the column would suffer from the intermittency of feed. In any case, the size of the chamber and frequency of valve opening will be so chosen that the highest liquid flow normally encountered can take place. Generally the chamber will fill part way with liquid and the rest of its volume will be filled with vapor.

The discharge valve must be located in the lowermost wall of the chamber—in its floor—so that the liquid portion of the charge will be the first to escape from the chamber. The tendency of the liquid to "flash" (vaporize as soon as the pressure is relieved) will provide the necessary force to discharge the liquid provided the outlet is at the lowest point.

It will be understood that this presupposes that the saturation pressure of the liquid entering the chamber is greater than the pressure which exists in the passage to which the chamber is connected to discharge on opening of the outlet valve. If the liquid were so cold that its saturation pressure did not exceed the pressure in the discharge conduit, the chamber form of dispensing device just described would not be employed and resort would be had to displacement means such as the metering devices previously described which would then act as a pump.

In all illustrated apparatuses it will be understood that arrangements are provided in which there is a substantial economy both of refrigeration and power through the evaporation of liquid oxygen placed under a pressure above column pressure by a relatively small displacement pump, which evaporation is effected by heat given up by a fraction of the entering air when the same is condensed by the refrigeration provided by the vaporization of the liquid oxygen and this is also true of the improved method. Other features and advantages of the systems have been pointed out above or will be apparent from what has already been said, and require no repetition here.

It is to be understood throughout the foregoing specification that pressures and temperatures are approximate in some cases, and that, moreover, pressure drops due to friction in pipes have generally gone unmentioned.

This application is a continuation-in-part of my application Serial No. 122,077, filed October 18, 1949, and also a continuation-in-part of my copending application Serial No. 81,589, filed March 15, 1949, respectively, both of which applications are now abandoned.

While there are in this application specifically described certain apparatuses by which the method which constitutes the invention of this application may be performed, and certain modifications of said method, these being disclosed for purposes of illustration, it will be appreciated that further modifications of the invention are possible without departing from its spirit or the scope of the appended claims.

What is claimed is:

1. Method of separating a gaseous mixture by refrigeration and rectification to provide a desired gaseous product which includes the delivery of a liquefied gaseous mixture, as rapidly as it is formed, into a column for rectification therein and maintaining the designed difference between the pressure of the liquefied gaseous mixture and the pressure within the column by passing such liquefied mixture through a metering device of the measuring chamber type having a fixed displacement rate slightly, but only slightly, exceeding the rate at which such liquid is produced.

2. Method of separating a gaseous mixture by refrigeration and rectification to provide a desired gaseous product which includes the delivery of a liquefied gaseous mixture, as rapidly as it is formed, into a column for rectification therein and maintaining the designed difference between the pressure of the liquefied gaseous mixture and the pressure within the column by passing such liquefied mixture through a metering device having a fixed displacement rate slightly exceeding the rate at which such liquid is produced in a series of individual quantities of at least substantially equal masses, and at least principally in liquid form, the cumulative mass of which quantities, over a given period, slightly exceeds the total mass of liquid produced in such period.

3. Method of separating a gaseous mixture by refrigeration and rectification to provide a desired gaseous product which includes the delivery of a liquefied gaseous mixture, as rapidly as it is formed, into a column for rectification therein and meanwhile maintaining a designed difference between the pressure of the liquefied gaseous mixture and the pressure within the column to which such liquefied mixture is delivered for rectification, by passing such liquefied mixture in a series of individually segregated quantities through a valved dispensing device of which the volumetric capacity, multiplied by the number of dispensing cycles in a unit of time, exceeds the quantity of such liquid produced in the same unit of time.

4. Method of separating a gaseous mixture by refrigeration and liquefaction to provide a desired gaseous product which includes effecting the maintenance of a predetermined difference between the pressure of a liquefied gaseous mixture and the pressure within a column to which such liquefied mixture is delivered for rectification, and effecting such delivery as rapidly as the liquid becomes available, by periodically, at uniformly timed intervals, segregating such portions of the liquefied mixture that the entire quantity thereof produced will be taken, and delivering each such portion separately to a column.

5. Method of separating a gaseous mixture by refrigeration and rectification to provide a desired gaseous product which includes the maintenance of a designed difference between the pressure of a liquefied gaseous mixture and the pressure within a column to which such liquefied mixture is delivered for rectification, and effecting complete delivery of such liquid as it becomes available, by periodically segregating in a chamber, whose volume multiplied by the number of segregations effected during a given unit of time slightly, but only slightly, exceeds the volume of liquefied mixture produced during such unit of time, portions of such mixture and delivering each such segregated portion separately to a column.

6. Method of separating a gaseous mixture by refrigeration and rectification to provide a desired gaseous product which includes the transfer from a first space containing, under a higher pressure, a liquid mixture to be rectified to a second space under a lower pressure in which second space said mixture will be subjected to a rectification process, including the steps of periodically establishing communication between said first space and a third space, cutting off said communication, then establishing communication between said third space, through a lower boundary thereof, and said second space, and then cutting off said second established communication, and repeating said steps at such frequency as to handle the entire liquid mixture produced.

7. Method of separating a gaseous mixture by refrigeration and rectification to provide a desired gaseous product which includes the transfer from a first space containing, under a higher pressure, a liquid mixture to be rectified to a second space under a lower pressure in which second space said mixture will be subjected to a rectification process, including the steps of periodically establishing communication between said first space and a third space, increasing the volume of said third space to a predetermined maximum, cutting off said communication and then establishing communication between said third space and said second space and reducing said third space to its volume before increase of the latter, and then cutting off said second established communication, and repeating said steps at such frequency as to handle the entire liquid mixture produced.

8. In a method of separating a gaseous mixture by refrigeration and rectification to provide a desired gaseous product in which method a liquid mixture to be rectified is transported from a high pressure space to a low pressure space, the procedure for insuring the effecting of such transport as fast as the liquid becomes available, but at the same time insuring against substantial transfer of any substantial mass of the mixture in a gaseous state, which comprises successively segregating from the high pressure space and then bringing into communication with the low pressure space individual masses of the mixture, at least mainly in the liquid state, said masses and the number thereof in a given time closely approximating, and at least as great as, the total quantity of liquid produced in such period.

9. Method of separating air by refrigeration and rectification to provide a desired gaseous product which includes the delivery of the air appropriately cooled and at least partially in liquid form into the high pressure section of a double column, and maintaining the designed differences in pressure between such high pressure section and the low pressure section of the column by a procedure which includes passing at least one of the principal fluids (enriched air and nearly pure nitrogen) in transit between such sections through a metering device of the measuring chamber type having a fixed maximum rate for the delivery of fluid therethrough, which rate slightly exceeds the rate at which said one fluid is made available in the high pressure section.

10. Method of separating air by refrigeration and rectification to provide a desired gaseous product which includes the delivery of the air appropriately cooled and at least partially in liquid form into the high pressure section of a double column, and maintaining the designed differences in pressure between such high pressure section and the low pressure section of the column by a procedure which includes passing enriched air in transit between such sections through a metering device of the measuring chamber type having a fixed maximum rate for the delivery of fluid therethrough, which rate slightly exceeds the rate at which enriched air is made available in the high pressure section.

11. Method of separating air by refrigeration and rectification to provide a desired gaseous product which includes the delivery of the air appropriately cooled and at least partially in liquid form into the high pressure section of a double column, and maintaining the designed differences in pressure between such high pressure section and the low pressure section of the column by a procedure which includes passing nearly pure nitrogen in transit between such sections through a metering device of the measuring chamber type having a fixed maximum rate for the delivery of fluid therethrough, which rate slightly exceeds the rate at which nearly pure nitrogen is made available in the high pressure section.

12. Method of separating a gaseous mixture by refrigeration and rectification to provide a desired gaseous product which includes the delivery of the gaseous mixture appropriately cooled and at least partially in liquid form into the high pressure section of a double column, and maintaining the designed differences in pressure between such high pressure section and the low pressure section of the column by passing each of the fluids in transit between such sections through a measuring chamber-type metering device individual to it having a fixed maximum rate for the delivery of fluid therethrough, which rate slightly exceeds the rate at which the fluid passing therethrough is made available in the high pressure section.

References Cited in the file of this patent

UNITED STATES PATENTS

| | | |
|---|---|---|
| 1,323,014 | Claude | Nov. 25, 1919 |
| 1,492,063 | Barbet | Apr. 29, 1924 |
| 2,295,809 | Schuftan | Sept. 15, 1942 |
| 2,552,451 | Patterson | May 8, 1951 |